United States Patent
Yoo et al.

(10) Patent No.: US 11,804,337 B2
(45) Date of Patent: Oct. 31, 2023

(54) METHOD FOR MANUFACTURING ELECTROCHEMICAL DEVICE HAVING EXPOSED METAL LAYER OUTSIDE PACKAGING

(71) Applicant: KOREA INSTITUTE OF ENERGY RESEARCH, Daejeon (KR)

(72) Inventors: Jung Joon Yoo, Daejeon (KR); Ji Haeng Yu, Daejeon (KR); Kyong Sik Yun, Daejeon (KR); Jeong Hun Baek, Daejeon (KR); Hyeon Jin Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 17/315,909

(22) Filed: May 10, 2021

(65) Prior Publication Data
US 2022/0310332 A1    Sep. 29, 2022

(30) Foreign Application Priority Data

Mar. 25, 2021 (KR) .......................... 10-2021-0038787

(51) Int. Cl.
*H01G 11/84* (2013.01)
*H01G 11/24* (2013.01)
*H01G 11/10* (2013.01)

(52) U.S. Cl.
CPC ............ *H01G 11/84* (2013.01); *H01G 11/10* (2013.01); *H01G 11/24* (2013.01)

(58) Field of Classification Search
CPC ..................................................... H01G 11/84
See application file for complete search history.

(56) References Cited

U.S. PATENT DOCUMENTS

| | | | | |
|---|---|---|---|---|
| 4,189,760 A | * | 2/1980 | Marshall | H01G 4/302 29/25.42 |
| 4,714,570 A | * | 12/1987 | Nakatani | H01B 1/20 106/1.23 |
| 5,766,789 A | * | 6/1998 | James | H01G 4/08 429/232 |
| 2007/0177333 A1 | * | 8/2007 | Umemoto | H01G 9/06 361/502 |

(Continued)

FOREIGN PATENT DOCUMENTS

| | | | |
|---|---|---|---|
| JP | 03214716 A | * | 9/1991 |
| JP | 05347233 A | * | 12/1993 |

(Continued)

*Primary Examiner* — David M Sinclair
(74) *Attorney, Agent, or Firm* — Rabin & Berdo, P.C.

(57) ABSTRACT

Disclosed herein is an electrochemical device forming a chip-capacitor or a super-capacitor. The electrochemical device includes: a ceramic substrate having a nonconductive ceramic layer, a current collecting layer disposed on a nonconductive ceramic layer and made of ceramic or cermet, and a metal layer arranged on outer surfaces of the nonconductive ceramic layer and the current collecting layer; an electrode having a positive electrode and a negative electrode and formed on the current collecting layer; and a nonconductive ceramic packaging module located on the ceramic substrate to accommodate electrolyte therein, wherein the metal layer is exposed to the outside of the nonconductive ceramic packaging module.

8 Claims, 8 Drawing Sheets

(56) References Cited

U.S. PATENT DOCUMENTS

| | | | | |
|---|---|---|---|---|
| 2007/0274024 | A1* | 11/2007 | Nemoto | H01G 11/22 361/502 |
| 2008/0117562 | A1* | 5/2008 | Maruyama | H01G 11/28 361/502 |
| 2010/0183915 | A1* | 7/2010 | Tamachi | H01G 11/74 429/185 |
| 2012/0092809 | A1* | 4/2012 | Tamachi | H01G 11/74 361/502 |
| 2014/0177135 | A1* | 6/2014 | Mano | H01G 11/78 361/502 |

FOREIGN PATENT DOCUMENTS

| | | | | |
|---|---|---|---|---|
| JP | 2005085628 | A | * | 3/2005 |
| JP | 2005209640 | A | * | 8/2005 |
| JP | 2010069620 | A | * | 4/2010 |
| JP | 2010161097 | A | * | 7/2010 |
| JP | 2012023220 | A | * | 2/2012 |
| JP | 2013211560 | A | * | 10/2013 |

* cited by examiner (a)  (b)

METHOD FOR MANUFACTURING ELECTROCHEMICAL DEVICE HAVING EXPOSED METAL LAYER OUTSIDE PACKAGING

BACKGROUND OF THE INVENTION

Field of the Invention

The present invention relates to an electrochemical device and a method for manufacturing the same, and more particularly, to an electrochemical device, which forms a chip-capacitor and a super-capacitor, and a method for manufacturing the same.

Background Art

A super-capacitor is a device using electric charges accumulated on an electrochemical double layer generated between a solid state electrode and an electrolyte, and includes an electrode attached to an electric conductor and an electrolyte solution impregnated in the electrode. A pair of charge layers (electrochemical double layers) of different signs are generated on the interface of the electrode. Such a super-capacitor is capable of being charged and discharged quickly, shows high charging and discharging efficiencies, and does not need repair and has a semipermanent lifecycle since showing very little deterioration in spite of repetition of charging and discharging. Therefore, such a super-capacitor is being spotlighted as a next-generation storage device capable of being used as an auxiliary battery or a substitution for a battery.

The super-capacitor shows a weight energy density which is a half to a tenth of a secondary battery according to properties of electrode active materials and shows power density which is 100 times superior in charging and discharging capacity.

The super-capacitor basically includes an electrode with a relatively large surface area like a porous electrode, an electrolyte, a current collector, and a separator. Moreover, the super-capacitor has an electrochemical mechanism that ions in the electrolyte move along an electric field and are adsorbed onto the surface of the electrode when voltage is applied to both ends of a unit cell electrode. Such a cell is sealed to upper and lower cases which are made of a metallic material, and upper and lower terminals are attached to outer cases of the upper and lower cases.

However, the conventional super-capacitor, if it is a coin type, has several disadvantages in that it is deteriorated in assemblability and productivity and requires lots of economic costs since needing a gasket and a coating material for insulating and sealing the upper and lower cases and needing coating and compressing processes. Furthermore, the conventional super-capacitor has another disadvantage in that welding and bending defects frequently occur while the upper and lower terminals are attached.

Finally, such disadvantages cause deterioration in functionality and usability of the super-capacitor.

In order to solve the above disadvantages, a chip type super-capacitor that a cell is formed on a wiring board and the space of the wiring board on which the cell is mounted is sealed with a lead to be mounted on the surface of a board of electronic equipment is being developed.

However, if a wiring board made of a plastic material is used, the super-capacitor may be deteriorated in performance due to moisture absorption. Additionally, due to the moisture absorption, there may be problem that a liquid electrolyte injected into the wiring board and the lead leaks through the body of the wiring board made of the plastic material.

In addition, the chip type super-capacitor may have the problem that the electrolyte leaks since a via formed in the wiring board bursts by pressure generated during operation. That is, because the cell and the electrolyte have a sealed structure in the inner space formed by the wiring board and the lead, pressure of the inner space may be increased by gas generated during the operation of the chip type super-capacitor. In this instance, the via located in the inner space is weaker to pressure than other parts of the wiring board since having the structure that a hole passing through the wiring board is filled with metal. Therefore, when pressure increases in the inner space, the electrolyte may leak through the via which is relatively weak.

SUMMARY OF THE INVENTION

Accordingly, the present invention has been made to solve the above-mentioned problems occurring in the prior arts, and it is an object of the present invention to provide an electrochemical device and a method for manufacturing the same, which can enhance thermal durability under process and operation conditions, and secure safety of corrosion resistance and chemical resistance to an electrolyte.

Technical objects to be achieved by the present invention are not limited to the above-described objects and other technical objects that have not been described will be evidently understood by those skilled in the art from the following description.

To accomplish the above object, according to the present invention, there is provided an electrochemical device, which forms a chip-capacitor or a super-capacitor, including: a ceramic substrate having a nonconductive ceramic layer, a current collecting layer disposed on a nonconductive ceramic layer and made of ceramic or cermet, and a metal layer arranged on outer surfaces of the nonconductive ceramic layer and the current collecting layer; an electrode having a positive electrode and a negative electrode and formed on the current collecting layer; and a nonconductive ceramic packaging module located on the ceramic substrate to accommodate electrolyte therein, wherein the metal layer is exposed to the outside of the nonconductive ceramic packaging module.

In an embodiment of the present invention, the current collecting layer may have an interspace formed through a laser scribing process according to a predetermined electrode pattern in order to insulate the negative electrode from the positive electrode, or may be formed through a 3D printing process or a screen printing process using paste containing ceramic or cermet.

In an embodiment of the present invention, the electrolyte accommodated in the packaging module is at least one selected from liquid electrolyte, solid polymer electrolyte, gel polymer electrolyte, ionic liquid electrolyte, and solid electrolyte. The electrode is formed at edge areas of the current collecting layer which are opposed to each other based on the interspace.

In an embodiment of the present invention, the ceramic packaging module includes: external wall layers which are higher than the electrode in order to provide an electrolyte accommodatable space; and a cover layer laminated on the external wall layers.

In an embodiment of the present invention, the ceramic packaging module is made of a ceramic material, and has a central hole formed at the center of the cover layer for injection or defoamation of the liquid electrolyte.

In an embodiment of the present invention, the electrolyte accommodatable space of the ceramic packaging module is formed in such a way that a laminated sheet is manufactured by laminating a plurality of nonconductive ceramic sheets through a lamination process and the laminated sheet is cut through a laser cutting process, a blade punch process, or a computer numerical control (CNC) process.

In an embodiment of the present invention, the metal layer is a layer for electrically connecting the ceramic substrate to an external circuit, and is made of at least one metallic material selected from silver (Ag), gold (Au), platinum (Pt), nickel (Ni), copper (Cu), aluminum (Al), iron (Fe), chrome (Cr), titanium (Ti), zinc (Zn), tin (Sn), molybdenum (Mo), tantalum (Ta), tungsten (W), carbon (C), and stainless steel.

In another aspect of the present invention, to accomplish the above object, there is provided a method for manufacturing an electrochemical device forming a chip-capacitor or a super-capacitor, the method including the steps of: manufacturing a ceramic substrate having a nonconductive ceramic layer, a current collecting layer disposed on a nonconductive ceramic layer and made of ceramic or cermet, and a metal layer arranged on outer surfaces of the nonconductive ceramic layer and the current collecting layer; forming an electrode having a positive electrode and a negative electrode on the current collecting layer; and manufacturing a nonconductive ceramic packaging module which can accommodate electrolyte therein, wherein the metal layer is exposed to the outside of the nonconductive ceramic packaging module.

In an embodiment of the present invention, the step of manufacturing the ceramic substrate includes the steps of: producing slurry using at least one selected from a group of binder, plasticizer, dispersant, and solvent, and ceramic powder or metallic oxide-ceramic mixed powder, or metal-ceramic mixed powder; and manufacturing green sheets by transforming the slurry into a tape type molded body using a tape caster.

In an embodiment of the present invention, the step of manufacturing the ceramic substrate further comprises the steps of: bonding and laminating the nonconductive ceramic layer and the current collecting layer by laminating a plurality of the green sheets through a lamination process; and forming a pattern of the current collecting layer by forming an interspace on the current collecting layer laminated on the nonconductive ceramic layer according to a predetermined electrode pattern through a laser scribing process or a computer numerical control (CNC) process or through a 3D printing or a screen printing process using paste containing ceramic or cermet.

In an embodiment of the present invention, the method for manufacturing an electrochemical device further includes the steps of: bonding the nonconductive ceramic layer and the current collecting layer, on which the pattern is formed, through a sintering process; applying hydrogen reduction treatment to the nonconductive ceramic layer and the current collecting layer which are bonded together; forming a metal layer on the outer surfaces of the nonconductive ceramic layer and the current collecting layer, to which hydrogen reduction treatment is applied; and coating the upper surface of the current collecting layer through at least one among electric gilding, gold immersion plating, conductive polymer coating, and carbon coating in order to improve conductivity of the current collecting layer.

In an embodiment of the present invention, the step of manufacturing the nonconductive ceramic packaging module includes the steps of: laminating a plurality of the green sheets through the lamination process so as to manufacture a laminated sheet having the thickness corresponding to the thickness of the ceramic substrate; and cutting the laminated sheet through a laser cutting process to form the electrolyte accommodatable space, wherein the electrolyte accommodatable space is formed to be higher than the electrode.

In an embodiment of the present invention, the nonconductive ceramic packaging module includes an external wall layer and a cover layer to form the electrolyte accommodatable space, and the cover layer has a central hole formed at the center thereof for injection and defoamation of liquid electrolyte. The step of manufacturing the nonconductive ceramic packaging module further includes the steps of: bonding the external wall layer with the cover layer through the lamination process; and sintering the external wall layer and the cover layer which are bonded.

In an embodiment of the present invention, the nonconductive ceramic packaging module is arranged on the ceramic substrate.

The electrochemical device according to the present invention can enhance thermal durability under the process and operation conditions by applying the ceramic material of low heat conductivity to the substrate and the nonconductive ceramic packaging module, and secure safety of corrosion resistance and chemical resistance to an electrolyte by using the ceramic packaging module.

Moreover, the electrochemical device according to the present invention can minimize separation between the existing metal current collecting layer and the substrate caused by a change in temperature since sintering, bonding and reduction processes are applied at high temperature, for instance, more than 1,000° C., in the form of ceramic cermet.

Furthermore, the electrochemical device according to the present invention is applicable to independent power generating devices requiring various capacities since providing various electrode patterns, such as interdigital formation.

The effects of the present invention are not limited to the above-mentioned effects, and it should be understood that the present invention includes all effects deducible from the components described in the specification or claims of the present invention.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
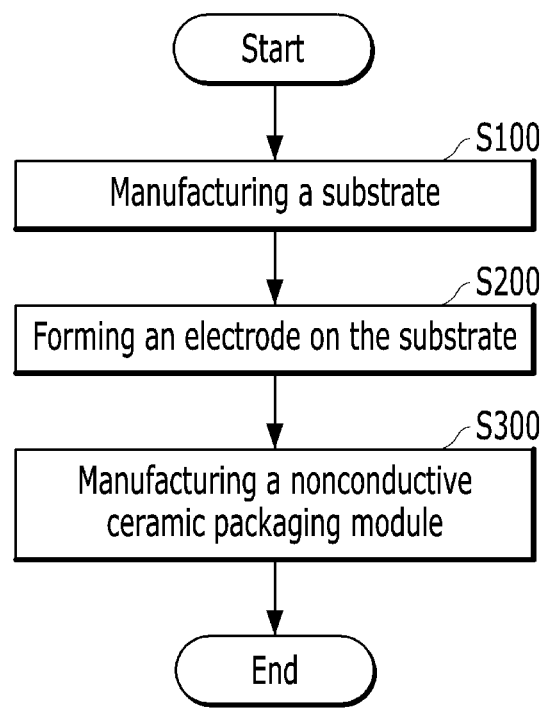
FIG. 1 is a flow chart showing a method for manufacturing an electrochemical device according to an embodiment of the present invention.

Hereinafter, the present invention will be described in detail with reference to the accompanying drawings. However, embodiments of the present invention may be implemented in several different forms and are not limited to the embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included.

It will be further understood that the words or terms used in the present invention are used to describe specific embodiments of the present invention and there is no intent to limit the present invention. The singular form of the components may be understood into the plural form unless otherwise specifically stated in the context. It should be also understood that the terms of 'include' or 'have' in the specification are used to mean that there are characteristics, numbers, steps, operations, components, parts, or combinations of the steps, operations, components and parts described in the specification and there is no intent to exclude existence or possibility of other characteristics, numbers, steps, operations, components, parts, or combinations of the steps, operations, components and parts.

Hereinafter, embodiments of the present invention will be described in detail with reference to the accompanying drawings.

A super-capacitor is an energy storage device which uses an electrolyte instead of a dielectric and stores electric energy generated on the surface of an electrode by a pair of charge layers (electrochemical double layers) of different signs included in the electrolyte, and is called an electrochemical double layer capacitor (EDLC). There are also pseudo-capacitors and hybrid capacitors. The pseudo-capacitors have an improved structure to store electric energy to all of the positive and negative poles by the electrochemical double layer and are to store charges by a very fast and reversible oxidation-reduction reaction occurring at the electrode-electrolyte interface. The hybrid capacitors show improved capacity characteristics of the super-capacitor since one pole uses an electrode material of high-capacity characteristics and the other pole uses an electrode material of high-power characteristics by using an asymmetric electrode having a positive pole and a negative pole to which different ways are applied.

The pseudo-capacitors and the hybrid capacitors are different from the super-capacitors in that they accumulate charges physically, but the method for manufacturing the super-capacitors can be applied to the pseudo-capacitors and the hybrid capacitors since the pseudo-capacitors and the hybrid capacitors adopt the form of the super-capacitor in the overall structure. Therefore, in this specification, the term of the super-capacitor means not only the electrochemical double layer capacitors but also superordinate concepts including all of capacitors having the same structure, such as pseudo-capacitors and hybrid capacitors.

Hereinafter, referring to the attached drawings, an electrochemical device according to an embodiment of the present invention is an electrochemical device which forms a chip-capacitor or a super-capacitor, and more preferably, is an electrochemical device forming a chip type super-capacitor.

Therefore, in this specification, the term of super-capacitor means not only an electrochemical double layer capacitor but also a pseudo-capacitor and a hybrid capacitor.

Figure 2:
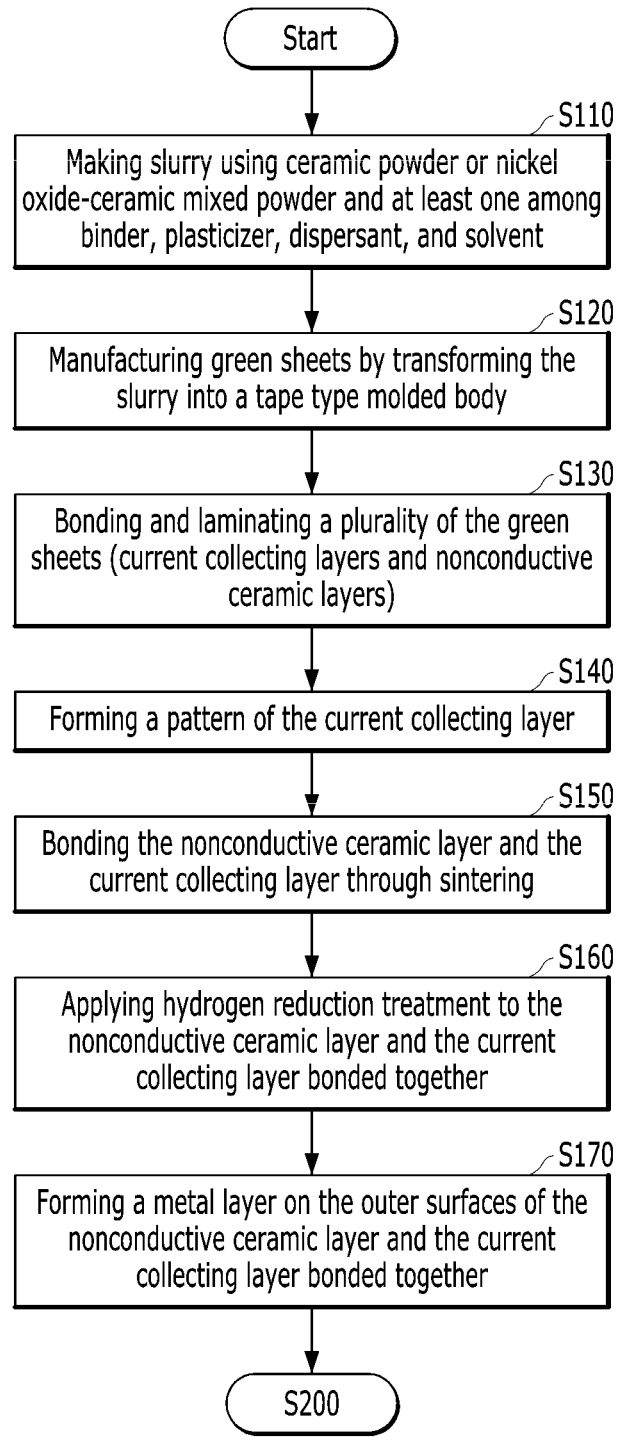
FIG. 2 is a flow chart showing a method for manufacturing a ceramic substrate according to an embodiment of the present invention in detail.
Figure 3:
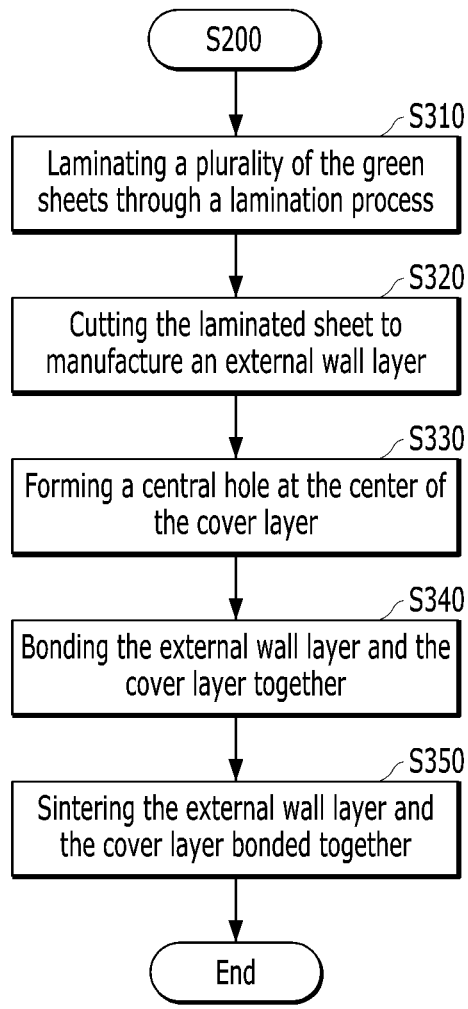
FIG. 3 is a view showing a method for manufacturing a nonconductive packaging module according to an embodiment of the present invention in detail.

FIG. 1 is a flow chart showing a method for manufacturing an electrochemical device according to an embodiment of the present invention, FIG. 2 is a flow chart showing a method for manufacturing a ceramic substrate according to an embodiment of the present invention in detail, and FIG. 3 is a view showing a method for manufacturing a nonconductive packaging module according to an embodiment of the present invention in detail.

As shown in FIG. 1, the method for manufacturing an electrochemical device according to the embodiment of the present invention includes the steps of: manufacturing a ceramic substrate 100 (S100); and forming an electrode 200 on the ceramic substrate 100 (S200). Moreover, the method for manufacturing an electrochemical device further includes a step (S300) of manufacturing a nonconductive ceramic packaging module 300 and laminating the manufactured nonconductive ceramic packaging module 300 on the ceramic substrate on which the electrode 200 is formed.

According to another embodiment of the present invention, after the step (S100), the method for manufacturing an electrochemical device may further include a step of forming a metal plating layer on the ceramic substrate 100. That is, after the ceramic substrate is manufactured, the metal plating layer is formed on the ceramic substrate 100, and the electrode 200 is formed on the metal plating layer formed on the ceramic substrate 100 in the step (S200). For instance, in this embodiment, the metal forming the metal plating layer formed on the ceramic substrate 100 may be at least one among silver (Ag), gold (Au), platinum (Pt), nickel (Ni), copper (Cu), aluminum (Al), iron (Fe), chrome (Cr), titanium (Ti), zinc (Zn), tin (Sn), molybdenum (Mo), tantalum (Ta), tungsten (W), carbon (C), and stainless steel.

In another embodiment, an upper surface of a current collecting layer is coated through a coating process, such as conductive paste coating, conductive polymer coating, carbon coating or the likes. Therefore, not only the metal plating layer (electric gilding and gold immersion plating) but also the coating of the current collecting layer can enhance conductivity of the current collecting layer. The metal plating layer according to this embodiment is effective in improving conductivity of the current collecting layer 110.

For instance, gold immersion plating is made on the ceramic substrate 100 in order to improve resistance for less than 1 ohm.

As described above, the electrochemical device according to the embodiment of the present invention includes the ceramic substrate 100, the electrode 200, and the nonconductive ceramic packaging module 300. Referring to FIG. 1, the ceramic substrate 100, the electrode 200, and the nonconductive ceramic packaging module 300 of the electrochemical device are manufactured in sequence, but the present invention is not limited to the above, and for instance, the ceramic substrate 100 and the electrode 200 may be manufactured after the nonconductive ceramic packaging module 300 is first manufactured.

Figure 4:
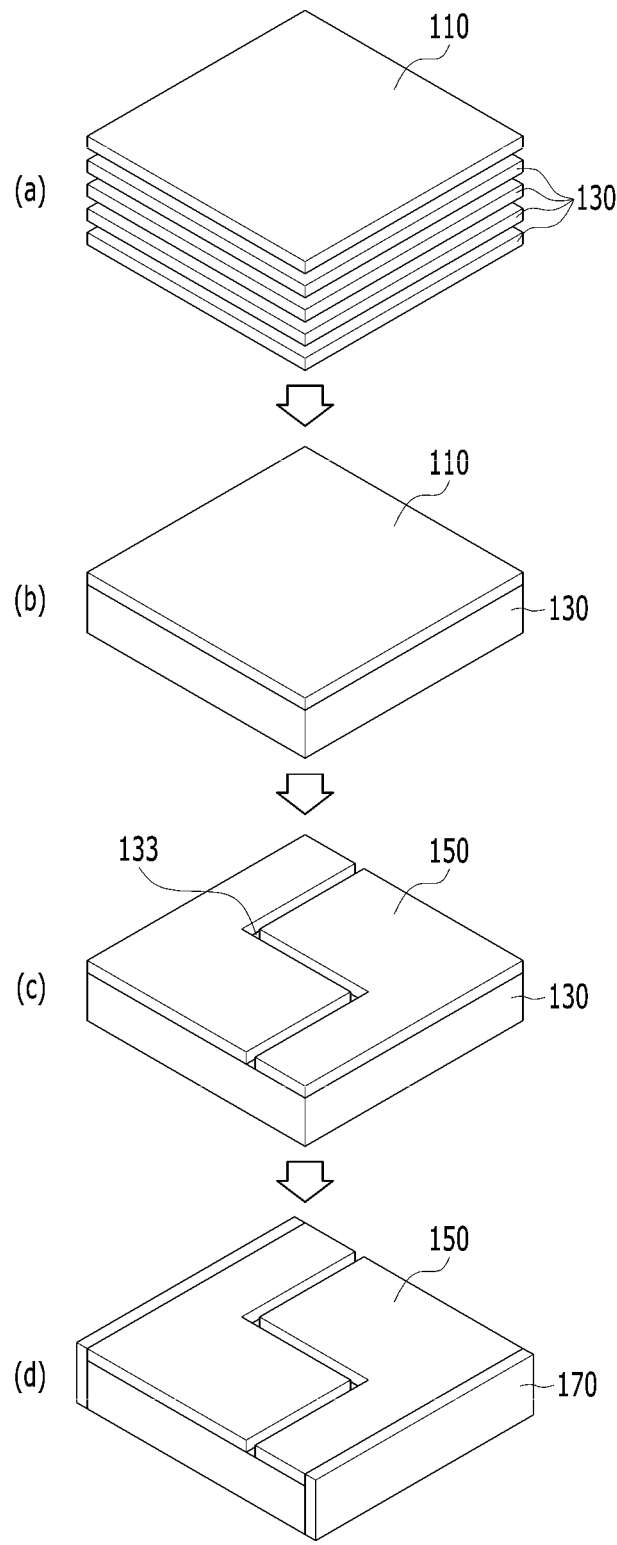
FIG. 4 is a view showing a process of manufacturing the ceramic substrate according to the embodiment of the present invention.

Hereinafter, referring to FIGS. 2 and 4, a method for manufacturing the ceramic substrate according to the embodiment of the present invention will be described in more detail. FIG. 4 is a view showing a process of manufacturing the ceramic substrate according to the embodiment of the present invention.

The ceramic substrate 100 according to the embodiment of the present invention includes a nonconductive ceramic layer 130, the current collecting layer 110, and a metal layer 170.

Referring to FIG. 2, in a step (S110), slurry is made using ceramic powder or nickel oxide (NiO)-ceramic mixed powder and at least one among binder, plasticizer, dispersant, and solvent.

For instance, according to the embodiment of the present invention, the slurry may be made using at least one selected from a group of binder, plasticizer, dispersant, and solvent, and ceramic powder or metallic oxide-ceramic mixed powder (in this instance, the metallic oxide is at least one among nickel oxide or copper oxide), or metal-ceramic mixed powder (in this instance, metal is at least one among silver (Ag), gold (Au), palladium (Pd), and platinum (Pt)). In this instance, a reduction process must be essentially carried out when metallic oxide-ceramic mixed powder is used, and the reduction process may be selectively carried out when metal-ceramic mixed powder is used.

For instance, slurry in which binder, plasticizer, solvent and ceramic powder are mixed together, and other slurry which is made using binder, plasticizer, solvent and nickel oxide (NiO)-ceramic can be produced.

Moreover, in a step (S120), the slurry made in the step (S110) is transformed into a tape type molded body to manufacture a green sheet.

That is, the method for manufacturing the ceramic substrate according to the embodiment of the present invention can manufacture a green sheet for making the nonconductive ceramic layer 130 and the current collecting layer 110 through a tape casting process.

Therefore, as shown in FIG. 4, the current collecting layer 110 and the nonconductive ceramic layer 130 can be laminated.

After the step (S120), in a step (S130), a plurality of the green sheets including the current collecting layers 110 and the nonconductive ceramic layers 130 can be bonded and laminated through a lamination process. Referring to FIG. 4, the ceramic substrate 100 according to the present invention is manufactured through the steps of laminating a plurality of the green sheets 130 as illustrated in FIG. 4(a), and laminating the current collecting layer 110, which consists of ceramic or cermet, on the laminated green sheets 130 (see FIG. 4(b)).

Furthermore, in a step (S140), an interspace 133 is formed depending on a predetermined electrode pattern on the current collecting layer 110 on the nonconductive ceramic layer 130 through a laser scribing process so as to form a pattern on the current collecting layer 110.

Additionally, in another embodiment of the present invention, in the step (S140), a pattern may be formed on the current collecting layer 110 using a computer numerical control (CNC) process. Alternatively, in the step (S140), a pattern may be formed on the current collecting layer laminated on the nonconductive ceramic layer 130 by forming the interspace according to a predetermined electrode pattern through the 3D printing or screen printing process using paste containing ceramic or cermet.

Here, the predetermined electrode pattern means an electrode pattern to be formed on an electrochemical device to be manufactured, and means a pattern of an electrode which will be manufactured in a follow-up process. A negative electrode 210 and a positive electrode 230 may be formed at edge areas of the current collecting layer 110 opposed to each other based on the formed interspace 133. In more detail, the negative electrode and the positive electrode of the electrode 200 may be respectively formed along the edge areas of the current collecting layer 110, which forms the interspace 133 (See FIG. 4(c)).

The interspace 133 formed on the current collecting layer 110 according to the embodiment of the present invention may have a pattern of an interdigital form in order to insulate the negative electrode from the positive electrode.

In addition, in a step (S150), the nonconductive ceramic layer 130 and the current collecting layer 110 on which the interspace 133 is formed are bonded through a sintering process. After that, in a step (S160), when hydrogen reduction treatment is applied to the bonded nonconductive ceramic layer 130 and the current collecting layer 110. They can be manufactured into a substrate 150 as illustrated in FIG. 4(d).

In an embodiment, the current collecting layer 110, on which the interspace 133 of the electrochemical device is formed, and the nonconductive ceramic layer 130 are bonded through the sintering process at 1,300° C. to 1,500° C., for instance, 1,400° C., so that the ceramic substrate 100 can be densified. Moreover, a current collecting layer reducing process (in this instance, NiO is converted into Ni) is applied to the sintered current collecting layer 110 under a hydrogen ($H_2$) condition of 700° C. or more in order to provide conductivity.

Next, in a step (S170), in order to electrically connect the substrate 150 to an external circuit, a metal layer 170 is formed on the outer surface of the substrate 150 to which hydrogen reduction is applied as described above. For instance, the metal layer 170 may be at least one metallic material selected among silver (Ag), gold (Au), platinum (Pt), nickel (Ni), copper (Cu), aluminum (Al), iron (Fe), chrome (Cr), titanium (Ti), zinc (Zn), tin (Sn), molybdenum (Mo), tantalum (Ta), tungsten (W), carbon (C), and stainless steel.

Referring to FIGS. 2 and 4, the substrate 100 according to the embodiment of the present invention may be formed by a zirconia (3YSZ; 3 mol % yttria stabilized zirconia, 8YSZ; 8 mol % yttria stabilized zirconia, ScSZ; scandia stabilized zirconia)-based ceramic material or a ceramic material which is good at mechanical strength like alumina ($Al_2O_3$) and at chemical stability to liquid electrolyte.

Additionally, the current collecting layer 110 may be made of a material including nickel-ceramic cermet.

Figure 5:
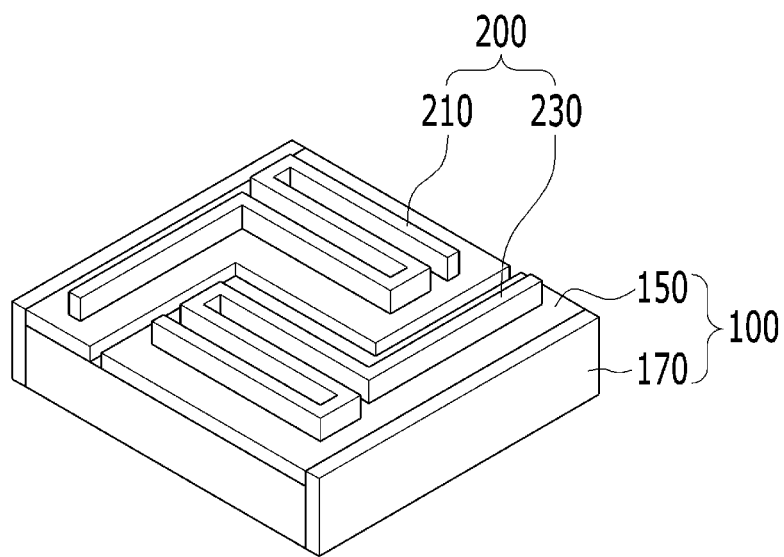
FIG. 5 is a view showing a state where an electrode is formed on a substrate according to an embodiment of the present invention.

FIG. 5 is a view showing a state where an electrode is formed on a substrate according to an embodiment of the present invention.

The electrode 200 of the electrochemical device according to the present invention includes a negative electrode 210 and a positive electrode 230, and is formed on the substrate 150 forming the interspace 133, in more detail, on the current collecting layer 110 located on the upper surface of the substrate 150 through a 3D printing process. The electrode 200 according to the embodiment of the present invention is an electrode manufactured through a 3D printer, and is laminated as high as a predetermined height from the substrate 150 so as to be formed three-dimensionally.

Figure 6:
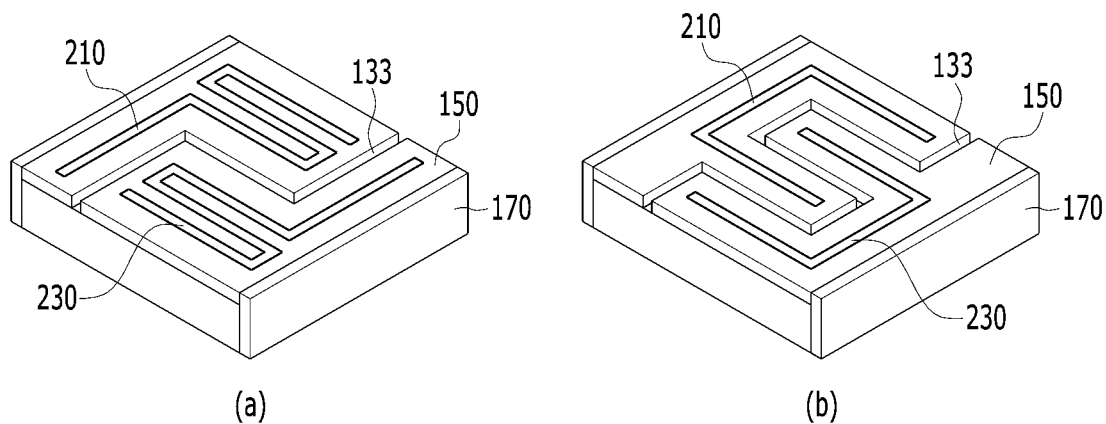
FIG. 6 is a view showing patterns of the electrode according to various embodiments of the present invention.

FIG. 6 is a view showing patterns of the electrode according to various embodiments of the present invention. As shown in FIGS. 6(*a*) and 6(*b*), the electrode 200 has the negative electrode 210 and the positive electrode 230 formed to be opposed to each other in an inter-digital form and may have various electrode patterns.

Figure 7:
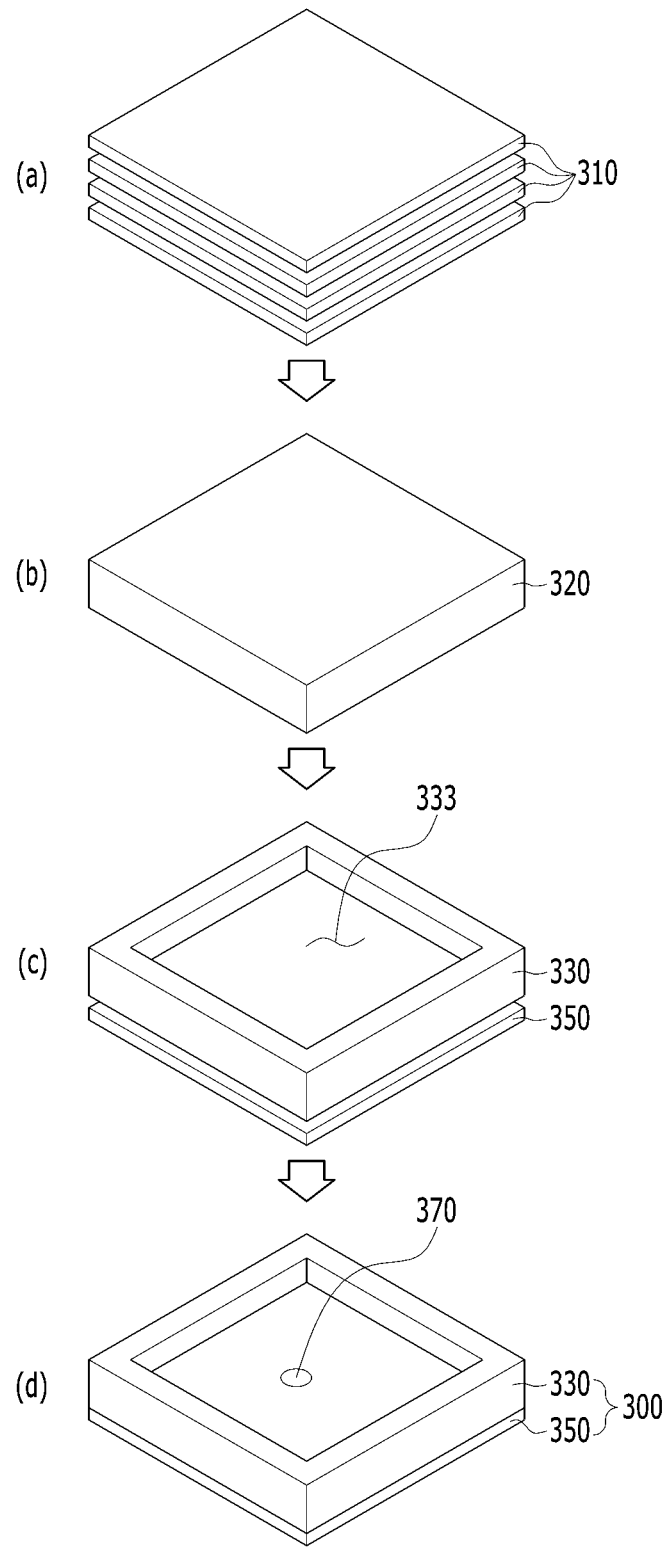
FIG. 7 is a view showing a method for manufacturing a nonconductive ceramic packaging module according to the embodiment of the present invention.

Hereinafter, referring to FIGS. 3 and 7, a method for manufacturing the nonconductive ceramic packaging module according to the embodiment of the present invention will be described in more detail. FIG. 7 is a view showing a method for manufacturing a nonconductive ceramic packaging module according to the embodiment of the present invention.

First, in a step (S310), a plurality of the green sheets 310 are laminated through the lamination process so as to manufacture a laminated sheet 320 (see FIGS. 7(*a*) and 7(*b*)).

In this instance, the green sheets 310 laminated to manufacture the laminated sheet 320 can be manufactured through the steps of producing slurry using at least one among binder, plasticizer, dispersant and solvent and ceramic powder, and transforming the produced slurry into a tape type molded body. As an example, the green sheets 310 manufactured to make the laminated sheet 320 can be manufactured in the same way as the method for manufacturing the green sheets for manufacturing the nonconductive ceramic layer 130 of the ceramic substrate 100.

For example, the laminated sheet 320 may have the thickness corresponding to the thickness of the ceramic substrate 100 by laminating the green sheets 310.

After that, in a step (S320), the laminated sheet 320 manufactured in the step (S310) is cut through a laser cutting process, a laser scribing process, or a computer numerical control (CNC) process, so that an external wall layer 330 which forms an electrolyte accommodatable space 333 may be formed as shown in FIG. 7(*c*). In another embodiment, the external wall layer 330 may be formed using a 3D printing process or a screen printing process after making paste including ceramic or cermet.

In this instance, preferably, the electrolyte accommodatable space 333 is formed to be higher than the electrode 200 formed on the ceramic substrate 100.

Additionally, in a step (S330), in order to bond on a surface of the external wall layer 330, a cover layer 350 of the nonconductive ceramic packaging module 300 formed by the green sheets may have a central hole 370 formed at the central portion thereof. The central hole 370 is a hole for injection or defoamation of the liquid electrolyte.

The cover layer 350 having the central hole 370 is bonded to the external wall layer 330 through the lamination process in a step (S340) (See FIG. 7(*d*)).

However, the central hole 370 is formed only when it is necessary to inject the electrolyte. So, in case that the ceramic substrate 100 is combined after the nonconductive ceramic packaging module 300 is turned upside down and the electrolyte is immersed, or in case that solid electrolyte is used, the central hole 370 is not needed. Therefore, in the step (S330) and in FIG. 7(*d*), the central hole may be selectively formed according to a skilled person's designs. In a step (S350), the bonded ceramic packaging module 300 is converted into a densified packaging module with thermal resistance and corrosion resistance through the sintering process at 1,300° C. to 1,500° C., for instance, 1,400° C.

The nonconductive ceramic packaging module 300 requires structural safety, temperature safety, and corrosion resistance and chemical resistance to the electrolyte, and may be made of the same material as the ceramic substrate 100.

In order to immerse the liquid electrolyte, an external wall structure of a dam type like an edge formed by the external wall layer 330 and the cover layer 350 is formed. For instance, the external wall layer 330 according to the present invention may have one of various shapes, such as a triangle, a square, a circle or others.

Figure 8:
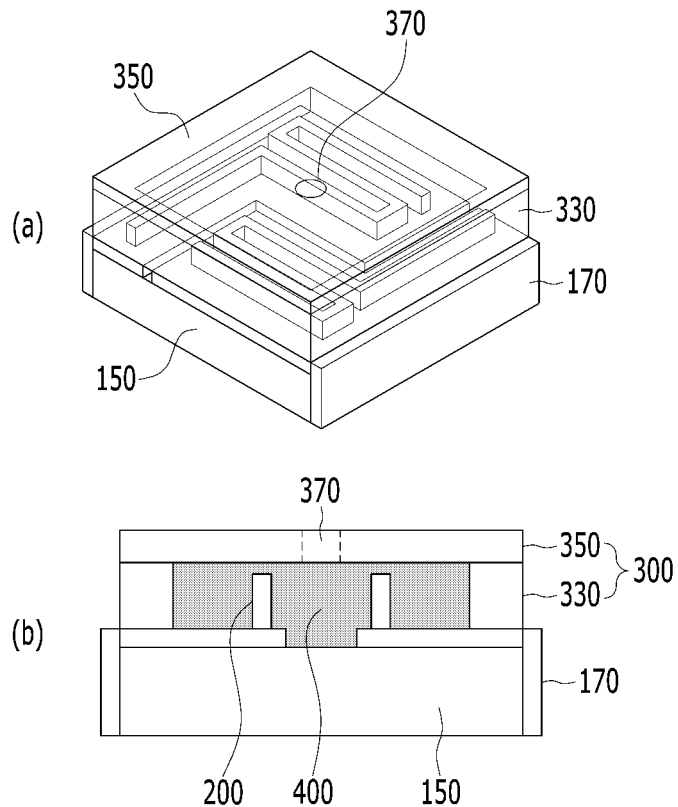
FIG. 8 is a view showing an example of an electrochemical device according to an embodiment of the present invention.

FIG. 8 is a view showing an example of an electrochemical device according to an embodiment of the present invention. FIG. 8(*a*) is a three-dimensional diagram of the electrochemical device, and FIG. 8(*b*) is a sectional view of the electrochemical device.

As illustrated in FIG. 8(*a*), the nonconductive packaging module 300 may be arranged on the ceramic substrate 100 on which the electrode 200 is formed.

Referring to FIG. 8(*b*), the electrolyte 400 may be located inside the electrochemical device by the nonconductive ceramic packaging module 300 according to the present invention. The electrolyte 400 according to the embodiment of the present invention may be liquid or solid.

Moreover, the metal layer 170 of the ceramic substrate 100 may be exposed to the outside of the nonconductive ceramic packaging module 300.

Figure 9:
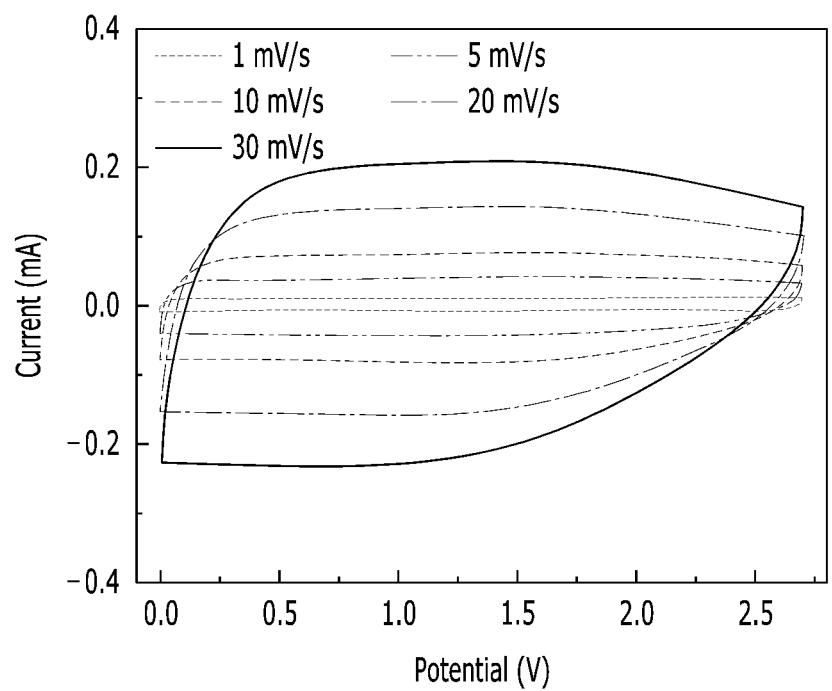
FIG. 9 is a cyclic voltammogram showing an electrochemical analysis result carried out according to an embodiment of the present invention.

FIG. 9 is a cyclic voltammogram showing an electrochemical analysis result carried out according to an embodiment of the present invention. FIG. 9 illustrates an electrochemical analysis result of the electrochemical device formed as shown in FIG. 6(*a*). As illustrated in FIG. 9, it is confirmed that the electrochemical device (capacitor) according to the present invention outputs a voltage-current flow of a typical capacitor.

Figure 10:
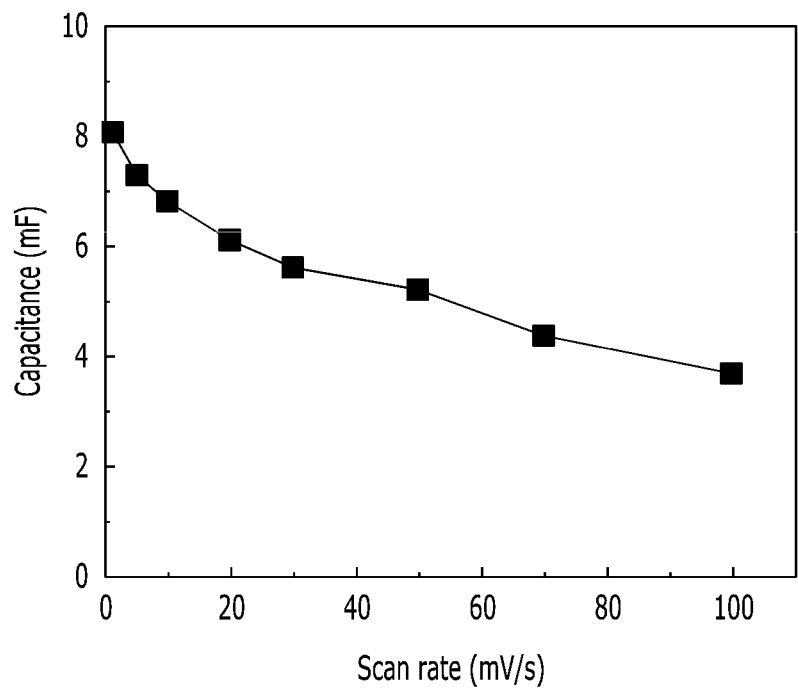
FIG. 10 is a graph showing a change in capacitance according to the electrochemical analysis result.

FIG. 10 is a graph showing a change in capacitance according to the electrochemical analysis result. Moreover, FIG. 11 is a graph showing an energy-and-power Ragone plot according to the electrochemical analysis result.

Figure 11:
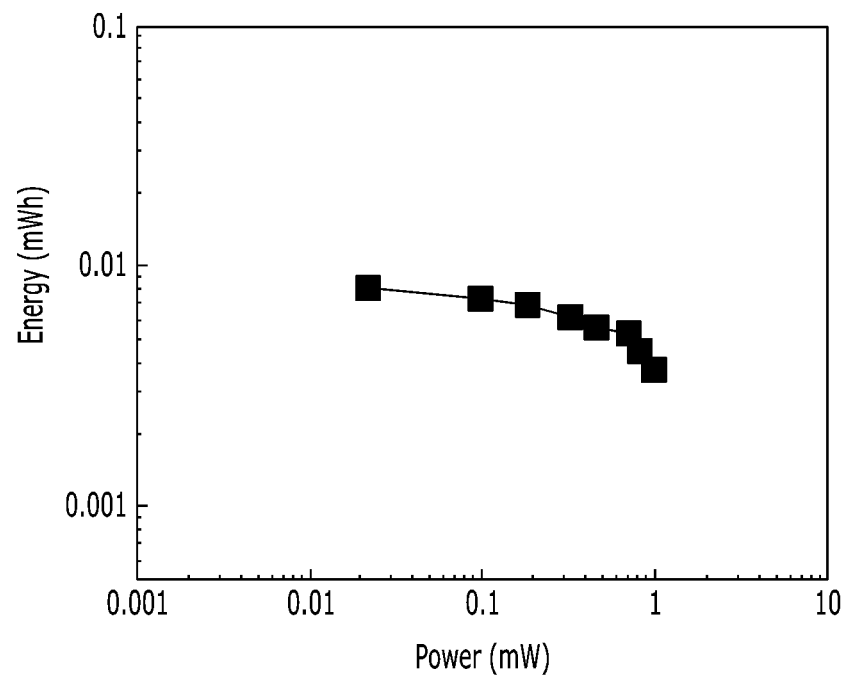
FIG. 11 is a graph showing an energy-and-power Ragone plot according to the electrochemical analysis result.

As confirmed in FIGS. 10 and 11, the electrochemical device according to the present invention is more excellent at capacitance, energy and output performance than the conventional electrochemical device (capacitor).

The electrochemical device according to the present invention can enhance thermal durability under the process and operation conditions by applying the ceramic material of low heat conductivity to the substrate and the nonconductive ceramic packaging module, and secure safety of corrosion resistance and chemical resistance to an electrolyte by using the ceramic packaging module.

Moreover, the electrochemical device according to the present invention can minimize separation between the existing metal current collecting layer and the substrate caused by a change in temperature since sintering, bonding and reduction processes are applied at high temperature, for instance, more than 1,000° C., in the form of ceramic cermet.

Furthermore, the electrochemical device according to the present invention is applicable to independent power generating devices requiring various capacities since providing various electrode patterns, such as interdigital formation.

Additionally, the electrochemical device according to the present invention can provide a general sandwich structure as well as the interdigital electrode patterns according to the structure and the manufacturing method of the electrochemical device of the present invention. However, if the electrochemical device according to the present invention has the general sandwich structure, a separation membrane located between the two electrodes may be added.

In addition, the electrochemical device according to the present invention does not require efforts, equipment, time and expenses to reduce resistance in order to form a chip capacitor like the conventional electrochemical devices, and does not require complexity and delicacy in the internal process of the cell. Moreover, the method for manufacturing the electrochemical device according to the present invention does not need conductive adhesive, a corrosion-proof layer process, and a welding process (soldering or laser welding).

The above description is only exemplary, and it will be understood by those skilled in the art that the invention may be embodied in other concrete forms without changing the technological scope and essential features. Therefore, the above-described embodiments should be considered only as examples in all aspects and not for purposes of limitation. For example, each component described as a single type may be realized in a distributed manner, and similarly, components that are described as being distributed may be realized in a coupled manner.

The scope of the present invention is defined by the appended claims, and encompasses all modifications or alterations derived from meanings, the scope and equivalents of the appended claims.

What is claimed is:

1. A method for manufacturing an electrochemical device forming a chip-capacitor or a super-capacitor, the method comprising the steps of:
    manufacturing a ceramic substrate having a nonconductive ceramic layer, a current collecting layer disposed on the nonconductive ceramic layer and made of cermet so as to improve bonding force with the nonconductive ceramic layer, and a metal layer arranged on outer surfaces of the nonconductive ceramic layer and the current collecting layer;
    forming an electrode having a positive electrode and a negative electrode on the current collecting layer; and
    manufacturing a nonconductive ceramic packaging module configured to accommodate electrolyte therein,
    wherein the metal layer is exposed to outside of the nonconductive ceramic packaging module; and
    wherein the step of manufacturing the ceramic substrate further comprises the steps of:
        laminating a plurality of green sheets to form the nonconductive ceramic layer;
        laminating the current collecting layer onto the nonconductive ceramic layer;
        forming an interspace in the current collecting layer;
        bonding, by a sintering process, the current collecting layer having the interspace to an upper surface of the nonconductive ceramic layer; and
        applying a hydrogen reduction treatment to the bonded current collecting layer and upper surface of the nonconductive ceramic layer to form a substrate containing the interspace.

2. The method for manufacturing an electrochemical device according to claim 1, wherein the step of manufacturing the ceramic substrate further comprises the steps of:
    producing slurry using at least one selected from a group of binder, plasticizer, dispersant, and solvent, and ceramic powder or metallic oxide-ceramic mixed powder, or metal-ceramic mixed powder; and
    manufacturing the green sheets by transforming the slurry into a tape type molded body using a tape caster.

3. The method for manufacturing an electrochemical device according to claim 1, further comprising the steps of:
    forming the metal layer on the outer surfaces of the nonconductive ceramic layer and the current collecting layer, to which the hydrogen reduction treatment is applied; and
    coating an upper surface of the current collecting layer through at least one among electric gilding, gold immersion plating, conductive polymer coating, and carbon coating in order to improve conductivity of the current collecting layer.

4. The method for manufacturing an electrochemical device according to claim 1, wherein the step of manufacturing the nonconductive ceramic packaging module comprises the steps of:
    laminating the plurality of the green sheets through the lamination process so as to manufacture a laminated sheet having a thickness corresponding to a thickness of the ceramic substrate; and
    cutting the laminated sheet through a laser cutting process to form an electrolyte-accommodating space, and
    wherein the electrolyte-accommodating space is formed to be higher than the electrode.

5. The method for manufacturing an electrochemical device according to claim 4, wherein the nonconductive ceramic packaging module includes an external wall layer and a cover layer to form the electrolyte-accommodating space, and the cover layer has a central hole formed at the center thereof for injection and defoamation of liquid electrolyte, and
    wherein the step of manufacturing the nonconductive ceramic packaging module further comprises the steps of:
    bonding the external wall layer with the cover layer through the lamination process; and
    sintering the external wall layer and the cover layer which are bonded.

6. The method for manufacturing an electrochemical device according to claim 1, wherein the nonconductive ceramic packaging module is arranged on the ceramic substrate.

7. The method for manufacturing an electrochemical device according to claim 1, wherein the metal layer is arranged only on opposing side walls of the bonded current collecting layer having the interspace and the nonconductive ceramic layer.

8. The method for manufacturing an electrochemical device according to claim 7, wherein the metal layer contacts each of two opposite sides of the bonded current collecting layer.

* * * * *